(12) United States Patent
Wei et al.

(10) Patent No.: US 8,873,924 B2
(45) Date of Patent: Oct. 28, 2014

(54) FIBER OPTIC CABINET

(75) Inventors: Jian Wei, Shanghai (CN); Bin Lu, Shanghai (CN); Bin Yu, Shanghai (CN); Yifeng Cui, Shanghai (CN); Peiyou Xiong, Shanghai (CN); Yingliang Peng, Shanghai (CN); Zhiyong Xu, Shanghai (CN); Yingyu Wang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 13/696,470

(22) PCT Filed: Jun. 23, 2010

(86) PCT No.: PCT/CN2010/074333
§ 371 (c)(1),
(2), (4) Date: Nov. 6, 2012

(87) PCT Pub. No.: WO2011/160297
PCT Pub. Date: Dec. 29, 2011

(65) Prior Publication Data
US 2013/0101262 A1 Apr. 25, 2013

(51) Int. Cl.
*G02B 6/36* (2006.01)
*G02B 6/44* (2006.01)
(52) U.S. Cl.
CPC ............ *G02B 6/4401* (2013.01); *G02B 6/4442* (2013.01)
USPC ........................................................ 385/135
(58) Field of Classification Search
None
See application file for complete search history.

(56) References Cited

U.S. PATENT DOCUMENTS

| | | | |
|---|---|---|---|
| 5,100,221 A | 3/1992 | Carney | |
| 5,133,038 A * | 7/1992 | Zipper | 385/135 |
| 5,548,678 A * | 8/1996 | Frost et al. | 385/135 |
| 5,734,776 A * | 3/1998 | Puetz | 385/134 |
| 6,097,872 A | 8/2000 | Kusuda | |
| 6,304,707 B1 | 10/2001 | Daems | |
| 6,778,752 B2 * | 8/2004 | Laporte et al. | 385/135 |
| 7,190,874 B1 | 3/2007 | Barth | |
| 7,728,225 B2 | 6/2010 | Anderson | |
| 8,275,417 B2 * | 9/2012 | Flynn | 455/561 |
| 8,542,973 B2 * | 9/2013 | Fabrykowski et al. | 385/135 |
| 8,606,067 B2 * | 12/2013 | Solheid et al. | 385/135 |
| 2006/0263029 A1 | 11/2006 | Mudd | |
| 2006/0268495 A1 * | 11/2006 | Standish et al. | 361/636 |
| 2006/0269204 A1 | 11/2006 | Barth | |
| 2006/0275009 A1 | 12/2006 | Ellison | |

(Continued)

FOREIGN PATENT DOCUMENTS

| | | |
|---|---|---|
| AU | 1979047877 | 6/1979 |
| CN | 101153943 A | 4/2008 |

(Continued)

*Primary Examiner* — Mike Stahl
(74) *Attorney, Agent, or Firm* — Janet A. Kling

(57) ABSTRACT

The present invention relates to a fiber optic telecommunication cabinet for use in fiber optic telecommunication networks. The fiber optic telecommunication cabinet comprises a base and a housing. The base has a plurality of ports passing through the base to allow passage telecommunication cables into the fiber optic cabinet. The fiber optic telecommunication cabinet further includes an optical fiber termination block attached to the base. The optical fiber termination block has a plurality of optical modules supported by the mounting frame, wherein the optical modules may be rotated in a plane perpendicular to the longitudinal direction of the fiber optic telecommunication cabinet from a first storage position to a second accessible position.

7 Claims, 13 Drawing Sheets

(56) References Cited

U.S. PATENT DOCUMENTS

| | | |
|---|---|---|
| 2009/0060421 A1 | 3/2009 | Parikh |
| 2009/0175588 A1* | 7/2009 | Brandt et al. ................. 385/139 |
| 2009/0263096 A1 | 10/2009 | Solheid |
| 2010/0290751 A1* | 11/2010 | Naudin et al. ................ 385/135 |
| 2012/0256526 A1* | 10/2012 | Wei et al. ...................... 312/237 |
| 2013/0230291 A1* | 9/2013 | Lichoulas et al. ............ 385/135 |

FOREIGN PATENT DOCUMENTS

| | | |
|---|---|---|
| CN | 101369040 A | 2/2009 |
| WO | WO 2004/034116 | 4/2004 |
| WO | WO 2006/088931 | 8/2006 |
| WO | WO 2011/079419 | 7/2011 |

\* cited by examiner

FIBER OPTIC CABINET

THE FIELD OF THE INVENTION

The present invention generally relates to a facility for use in the outside plant for an optical fiber distribution system. More specifically, present invention relates to a fiber optic cross-connect cabinet.

BACKGROUND OF THE INVENTION

In recent years, consumer demand for content providers such as telecommunication and cable companies to offer bundled (Triple Play) high speed data, video, and voice service has increased drastically. As a result, the amount of telecommunication equipment and components required in the Outside Plant Network (OSP) has increased as well. These components and equipment require a telecommunication fiber optic cabinet that can provide environmental protection.

In optical networks, a telecommunication fiber optic cabinet can be a fiber optic cabinet to provide fiber splicing, cross connection, protection and other functions. Most conventional fiber optic cabinets are located above ground level. Due to restrictions and requirements from various governmental entities (e.g., city municipalities), it has become increasingly difficult to obtain the required permits for the addition of above ground utility cabinets and fiber optic cabinets. In addition it can be expensive to install a wholly new underground fiber optic cabinet, thus specific interest has materialized to reduce the size while increasing the capacity and functionality of below ground fiber optic cabinet systems.

Because telecommunication lines, especially optical fiber cables, are frequently run under ground and are accessible via manholes, a high density optical fiber cabinet which is easily accessible from a manhole will enhance the deployment of optical fiber networks in locations where above ground placement of cabinets is not possible.

SUMMARY OF THE INVENTION

The present invention relates to a fiber optic telecommunication cabinet for use in fiber optic telecommunication networks. In particular, the fiber optic telecommunication cabinet can be an underground fiber optic cabinet that resides in a standard manhole and can be used as a fiber optic cross-connect cabinet.

The fiber optic telecommunication cabinet comprises a base and a housing, wherein the base is configured for attachment to an open first end of the housing to provide an enclosed configuration. The housing defines a longitudinal direction of the fiber optic telecommunication cabinet between the base and a second end of the housing. The base has a plurality of ports passing through the base to allow passage telecommunication cables through the base and into the fiber optic cabinet. The fiber optic telecommunication cabinet further includes an optical fiber termination block attached to the base. The optical fiber termination block includes a mounting frame to attach the optical fiber termination block to the base of the fiber optic cabinet and a plurality of optical modules supported by the mounting frame. The optical modules are pivotally mounted within the optical fiber termination block and can be rotated in a plane perpendicular to the longitudinal direction of the fiber optic telecommunication cabinet from a first storage position to a second accessible position.

BRIEF DESCRIPTION OF THE DRAWINGS

The present invention will be further described with reference to the accompanying drawings, wherein.

Figure 1:
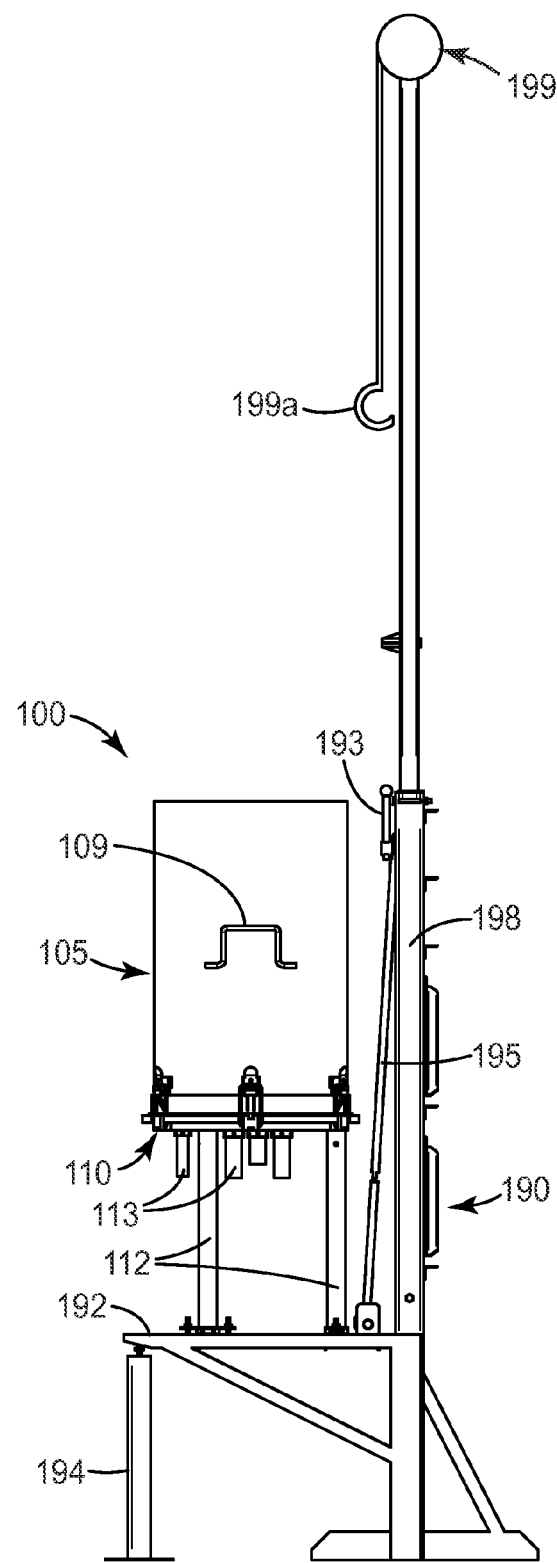
FIG. 1 shows a side view of an exemplary fiber optic cabinet in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DESCRIPTION OF THE PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a telecommunication fiber optic cabinet, in particular an underground fiber optic cabinet. The exemplary fiber optic cabinet, described herein, is of a smaller size such that it can reside in a standard manhole. In particular, the fiber optic cabinet can be fitted to a lift that enables the fiber optic cabinet to be raised above ground level for easier access during installation and maintenance operations. Specifically, the exemplary fiber optic cabinet is designed to be used in conjunction with one or more modular optical fiber termination blocks to provide a higher density of optical connections than is currently available. Exemplary optical fiber termination blocks include a plurality of rotatable optical modules to facilitate installation and maintenance of the connections in the exemplary fiber optic cabinet.

Referring to FIGS. 1 and 2A-2D, an exemplary telecommunication fiber optic cabinet in particular an underground fiber optic cabinet 100 according to one embodiment of the invention is illustrated. The fiber optic cabinet 100 includes a base 110, an optical fiber termination block 140 disposed on the base, and a housing 105 removeably securable to the base 110 and covering the optical fiber termination block when the housing is secured to the base. The optical fiber termination block 140 according to the present invention has a generally open, frame-like structure and comprises a mounting frame 142 for attaching the optical fiber termination block 140 to the base 110 of fiber optic cabinet 100 and a mounting structure 144 for receiving a plurality of optical modules 150 attached to the mounting frame.

The housing 105 is hollow and defines a longitudinal internal cavity 107 (FIG. 2A) extending from a first end 102 to a second end 104 of the housing 105. The internal cavity 107 has a circumferential shape in a direction transverse to the longitudinal direction. An opening at the first end 102 of the housing 105 is shaped and sized to fit over and engage with the base 110 in a conventional manner. Thus, the internal cavity of the housing defines the longitudinal direction of the fiber optic telecommunication cabinet that is disposed between the base and a second end of the housing. When engaged, the base 110 and housing 105 provide protection (i.e. an environmental seal) for the internal components of the fiber optic cabinet 100 from weather, insects and other external hazards.

The base 110 and housing 105 can include mating flanges 111, 106, respectively, to facilitate securing of the housing to the base. A sealing member 115, for example an O-ring, may be disposed on or adjacent to one of the housing mating flange 106 or the base mating flange 111 to enable an environmental seal to be formed between the base and the housing when the housing is secured to the base.

Figure 3A:
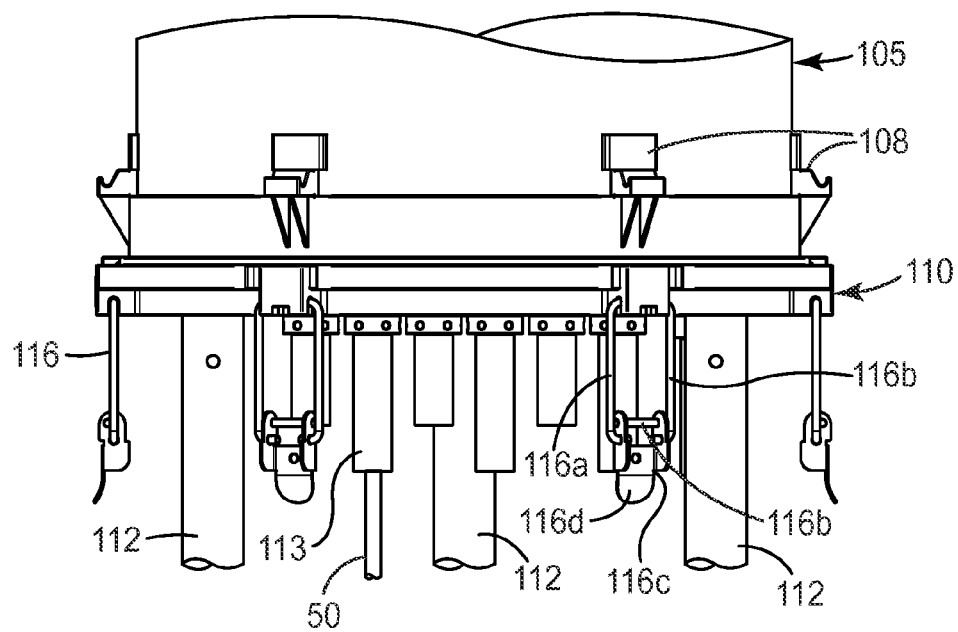
FIGS. 3A and 3B show close-up side views of an exemplary securing mechanism that can be used in conjunction with an exemplary fiber optic cabinet in accordance with the present invention.
Figure 3B:
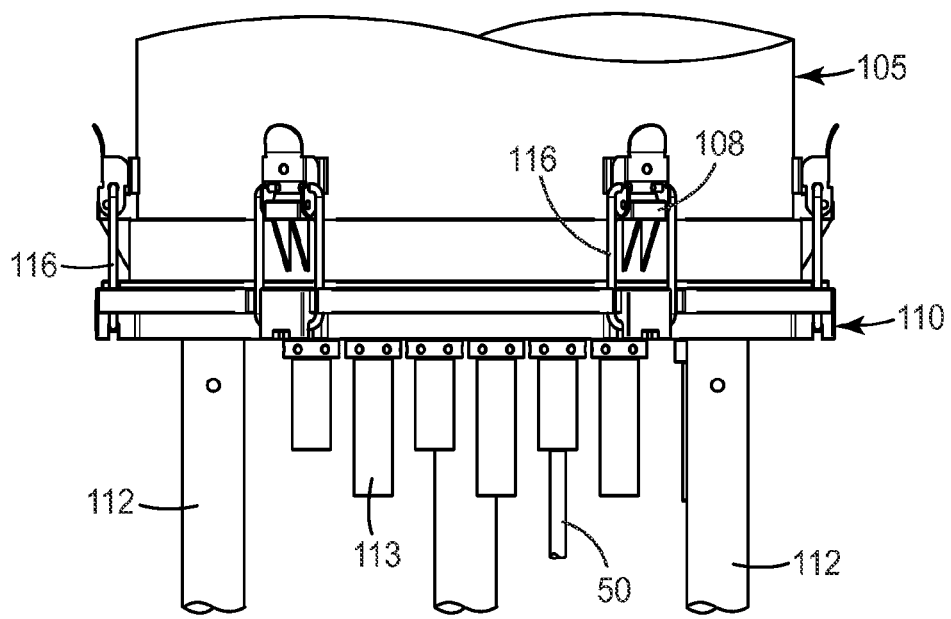

In one exemplary aspect, the housing 105 can be secured to the base 110 by clamping members 116 attached to one of the base and the housing. FIG. 3A shows the clamping members 116 in an unlatched configuration. FIG. 3B shows the housing secured to the base by a plurality of clamping members 116 disposed around the perimeter of the base and the housing. The exemplary clamping members provide for tool-less opening and closing of the fiber optic cabinet.

Clamping member 116 has extension arms 116a that are pivotally attached at one end to the flange 106, 111 of the housing and base, respectively. A levering latch body 116c is pivotally attached to the second end of extension arms 116a. Clamping member 116 has a latch bar 116b attached to a forward portion the levering latch body 116c at a position that is offset from the connection point of the extension arms 116a to the levering latch body 116c. The latch bar 116b engages with a catch 108 on either the housing or base to secure the housing to the base. Finally, the levering latch body 116c has a lifting tab 116d extending obliquely from an end of the levering latch body opposite where the latch bar 116b is connected to the levering latch body to facilitate releasing the clamping mechanism.

In an exemplary aspect, the housing may have one or more handles 109 disposed around the outer surface of the housing to facilitate the craftsman's removal of the housing from the base for installation of maintenance activities. Optionally, the housing may have an additional handle located on the top closed end of the housing for the same purpose.

Figure 4A:
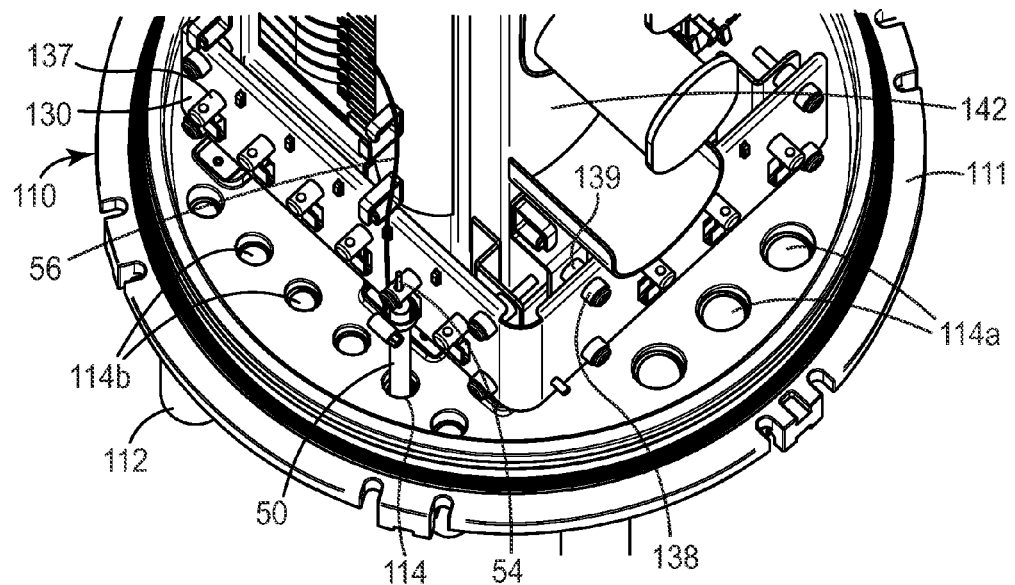
FIGS. 4A and 4B show isometric detail views of a portion of the internal structures of an exemplary fiber optic cabinet in accordance with the present invention.

The base 110 includes at least one port 114 for receiving a telecommunication cable 50 therethrough. The ports 114 allow passage of a single cable, or multiple cables in combination with a sealing member as is known in the art. The base 110 may have one, two, or any other number ports 114 as is required for a particular fiber optic cabinet 100. The ports can be of an appropriate size and shape to allow passage of the cables to be interconnected within the fiber optic cabinet. For example, FIG. 4A shows a base 110 having 3 large ports 114a to allow entry of up to three main cables into the fiber optic cabinet and six smaller ports 114b to allow up six smaller distribution cables to exit the fiber optic cabinet.

In an exemplary aspect, the housing 105 and cavity 107 therein can have an elliptical transverse cross-section. In the embodiment shown in FIGS. 2A-2D, the housing 105 and cavity 107 therein can have a substantially circular transverse cross-section, and having a closed second end 104. The base 110 generally has a shape similar to the cross-section of the housing so that a reliable seal is made when the housing and the base are secured to one another. Thus base 110 can have a substantially circular cross-section in the transverse direction that matches with the shape of the open end of the housing 105. However, in practice, the shapes of the base 110 and housing 105 are not so limited, and in other embodiments the housing 105 and base 110 may have other shapes and cross-sections. For example, shape of the transverse cross-section of the housing 105 and base 110 may be substantially circular, rectangular, square, or any other shape as is required or desired for a particular application. The closed second end 104 of the housing 105 may likewise be any suitable shape. In other embodiments, the closed second end 104 of the housing 105 is not monolithically formed with the remainder of the housing 105, as shown in the illustrated embodiment. For example, in other embodiments the housing 105 can comprise an assembly of components, such as a longitudinal hollow body having two open ends, wherein a cap or other similar device is used to form the closed second end 104. In one embodiment, the housing 105 can have internal or external rib members in applications where required to meet external pressure requirements.

Base 110 can further comprise a plurality of legs 112 extending from the base to keep the main body of the fiber optic cabinet elevated at a sufficient height to allow the telecommunication cables 50 to freely enter and exit the ports 114 disposed within the base. In FIGS. 1 and 2, fiber optic cabinet 100 is shown as having three legs 112 extending from base 110. Those skilled in the art will recognize that there may be other suitable configurations that will enable the fiber optic cabinet to be stably supported.

In an exemplary embodiment, the fiber optic cabinet 100 can be disposed on a lift 190 as shown in FIG. 1. In particular, the legs 112 on the base 110 of the fiber optic cabinet can be attached to a lift platform 192 of lift by mechanical fasteners (e.g. bolts, not shown). Lift 190 can have lifting rod 195 attached to lift platform 192 to facilitate raising the fiber optic cabinet to ground level for installation and maintenance. The lifting rod can have an eyelet on the end opposite the one that is attached to the lift platform. A hook 199a on one end of a cable from a winch 199 may be connected to the eyelet on the lifting pole to facilitate the raising of lift platform 192 along guide rails 198. In an exemplary aspect, the eyelet on the lifting pole can be fastened by a pin 193 to the lift 190 when the fiber optic cabinet is in its installed position in the manhole to prevent the fiber optic cabinet from floating in the event of high water within the manhole. The lift platform can rest on a pair of support braces 194 when the fiber optic cabinet 100 is disposed in an underground location. Each support brace can include an adjustable stage element 194*a* (FIG. 8B) that can be used to ensure that the lift platform and hence the fiber optic cabinet is level when the fiber optic cabinet is in its in-use condition within manhole 200. The support braces in conjunction with the lift provide a stable support structure for the fiber optic cabinet.

Figure 2A:
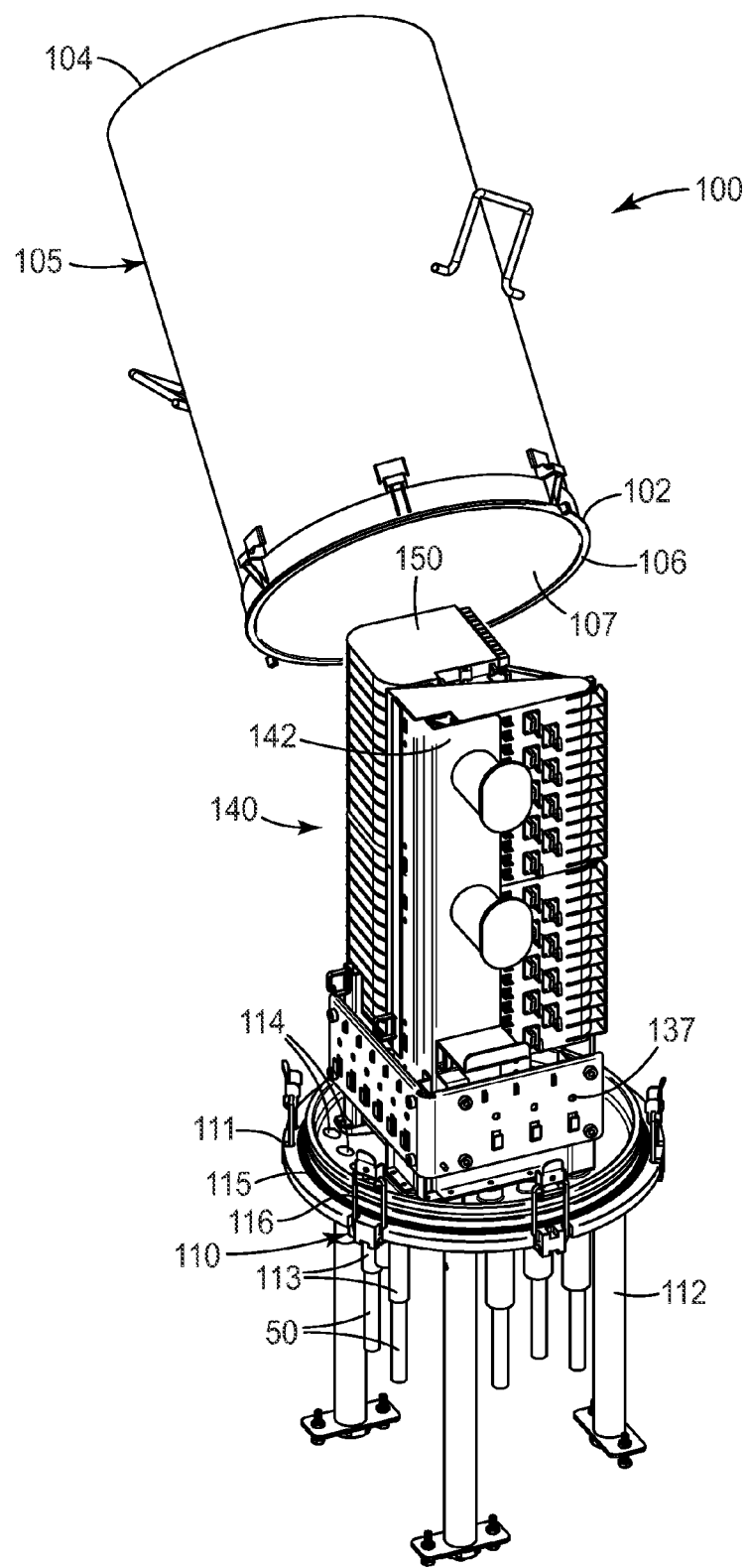
FIG. 2A shows an isometric view of an exemplary fiber optic cabinet of FIG. 1 with the fiber optic cabinet's housing removed.
Figure 2B:
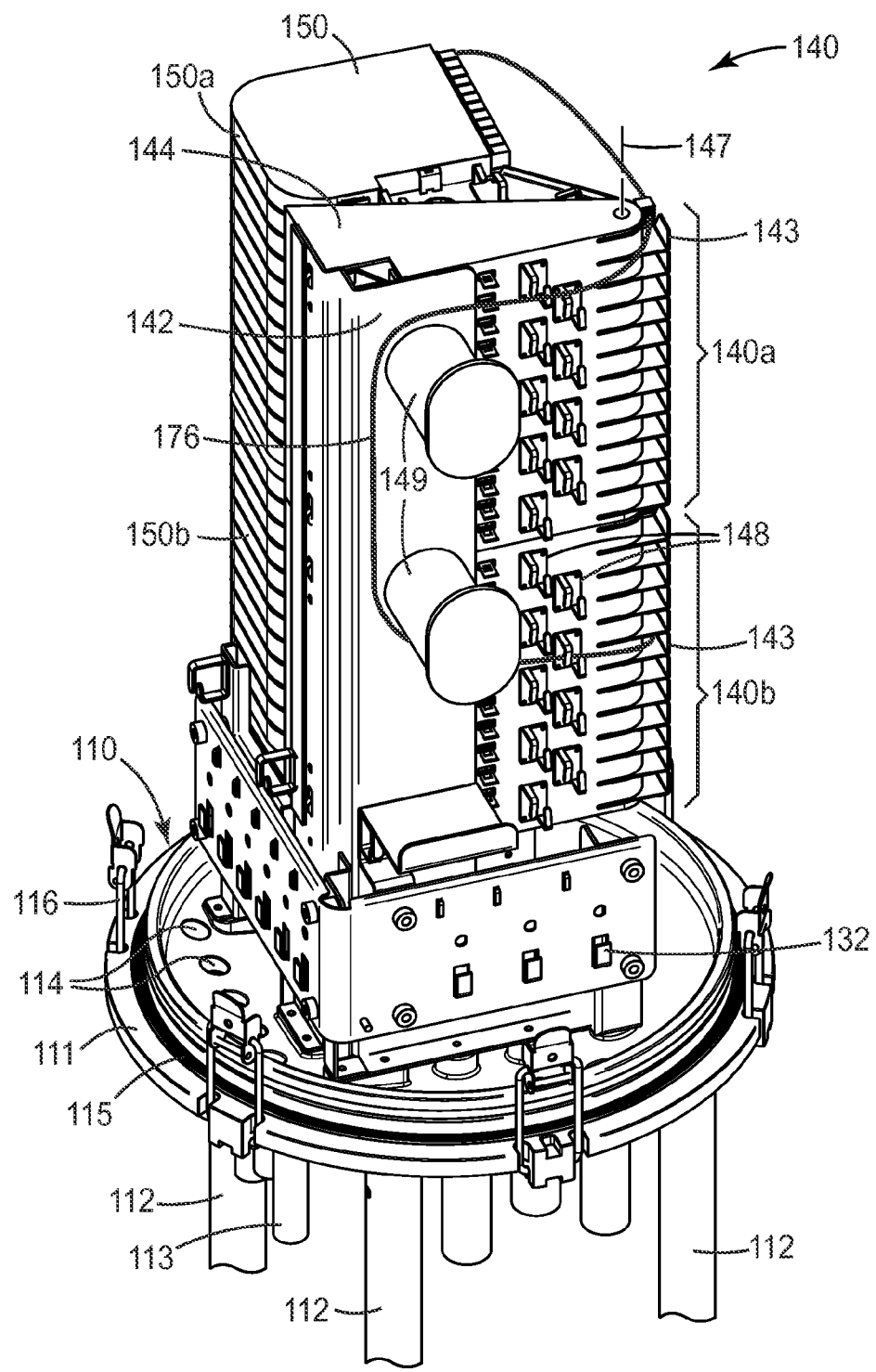
FIGS. 2B-2D show three alternative isometric views of an exemplary fiber optic cabinet in accordance with the present invention.
Figure 2C:
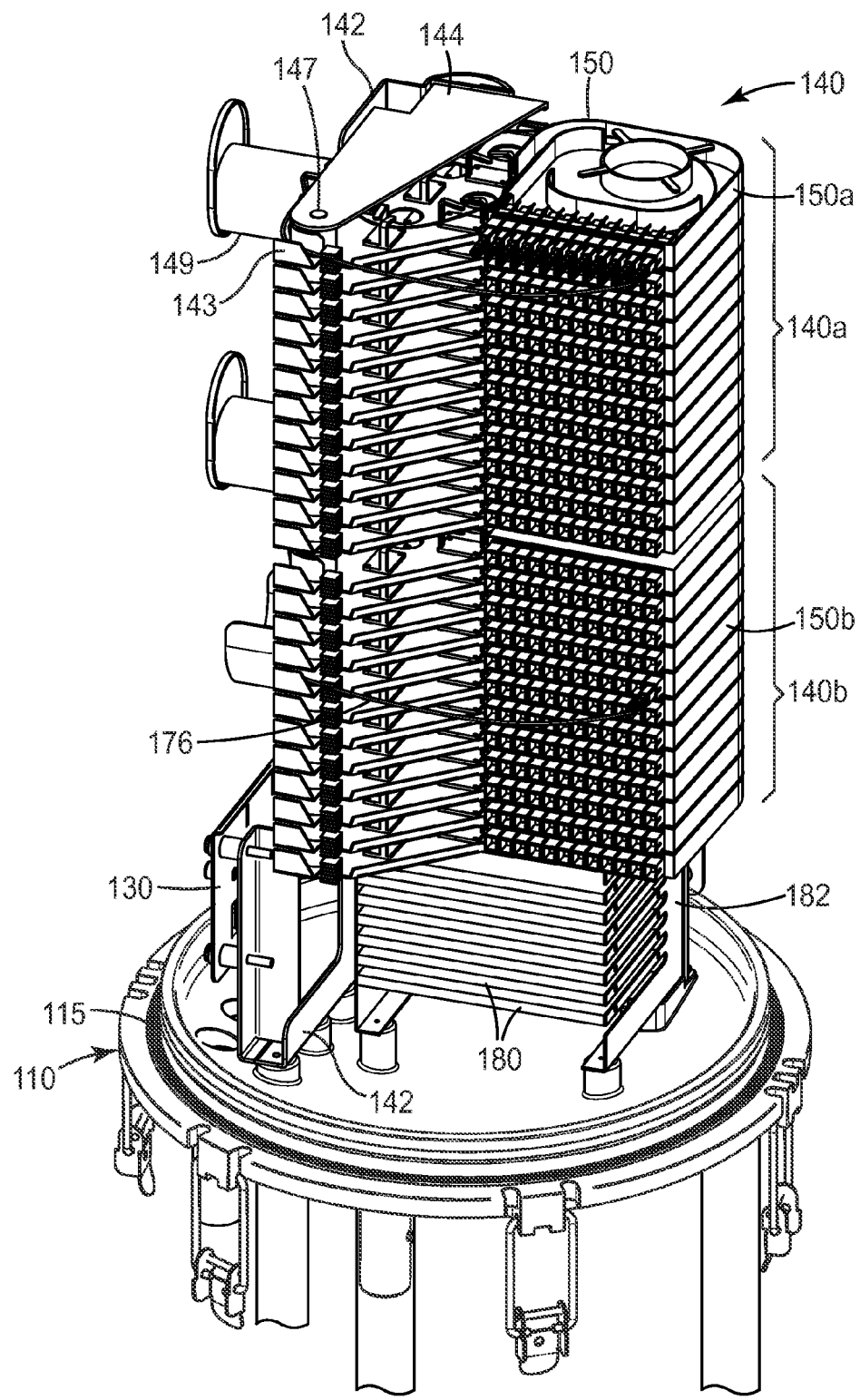
Figure 2D:
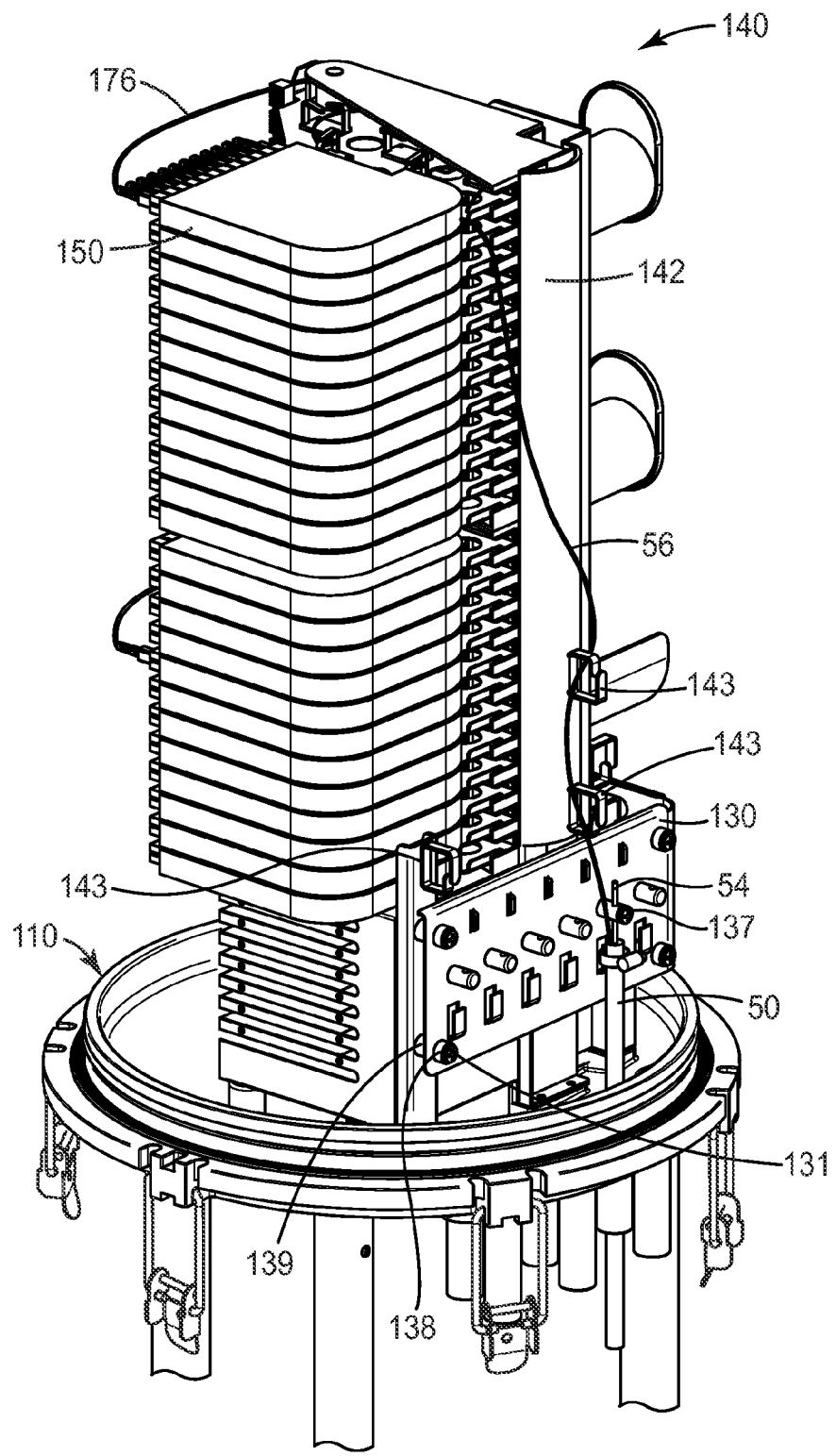
Figure 4B:
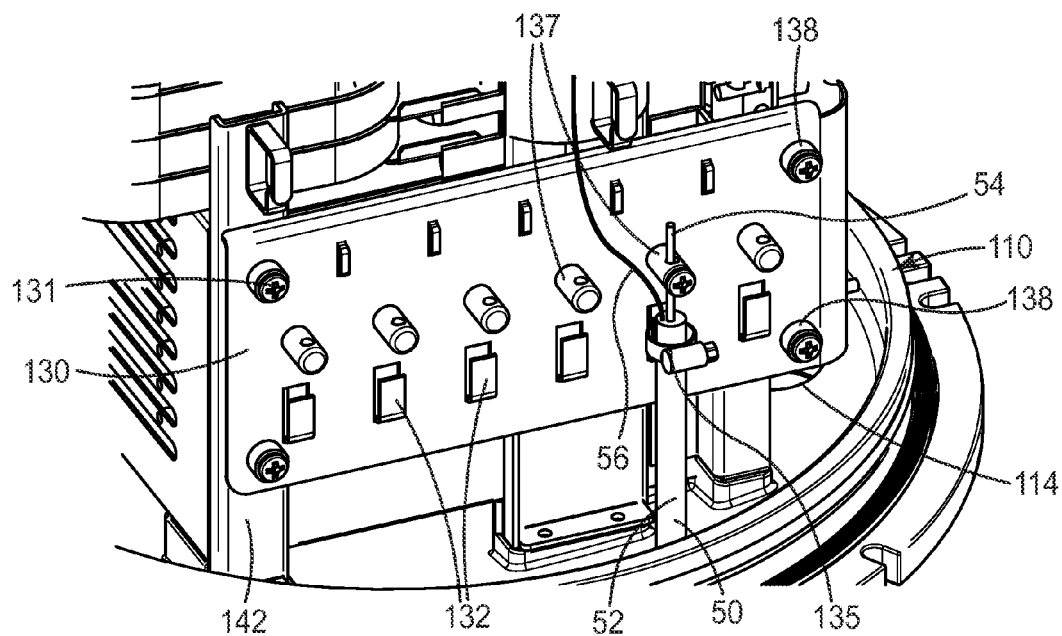

Referring to FIGS. 2D, and 4A-4B, telecommunication cables 50 enter the fiber optic cabinet through ports 114 in base 110. The ports allow passage of a single cable, or multiple cables in combination with a sealing member as is known in the art. For purposes of clarity, the invention is described herein as used with telecommunication cables or simply "cables" having one or more telecommunication lines therein. However, such use is exemplary only, and it is understood and intended that the present invention is equally suitable for use with a variety of cable types including, but not limited to, electrical power cables, optical fiber cables, copper wire cables, coaxial cables, drop lines, branch lines, and distribution lines, to name a few. Optical fiber cables can typically have a semi-rigid outer sheath 52 surrounding at least one loose buffer tube 56 containing at least one optical fiber and an optional strength member 54, although many convention cable designs are commercially available. One to twelve optical fibers in the form of a ribbon or as individual buffer coated fibers may reside in the buffer tube surrounded by a water-blocking gel or grease. Strength members 54 may be in the form of semi-rigid rods, a collection of loose fibers e.g. made of aramid fibers, an aramid yarn or string or a combination thereof.

Each port 114 can have a tubular portion 113 extending from the lowers side of the base. The tubular portion can be an integral part of the base or can be a separable part which can be attached to the base during installation of the fiber optic cabinet. For example, the tubular portion may have a male threaded end which mates with a female threaded portion of a port in the base of the fiber optic cabinet. When a separable tubular portion is used, a sealing element may be fitted around the end of the tubular portion which is to be inserted into the port of the fiber optic cabinet to help maintain the environmental sealing of the fiber optic cabinet. A collapsible protective sleeve (not shown) may be fitted over the tubular portion and extend over a length of cable to provide a seal between the tubular portion of port 114 and the telecommunication cable entering the fiber optic cabinet. In an exemplary embodiment, ports may be oriented concentrically with the outer edge of the base. In an alternative embodiment, sealing can be provided by an inlet device as described in published U.S. Patent Publication No. 2009/0060421A1. If an inlet device as described is to be used in conjunction with the fiber optic cabinet of this disclosure, the port will have a complimentary structure to accept the inlet device. In an alternative embodiment, the ports in the base of the optical fiber cabinet can be in the form of a knockout such that they are sealed prior to a cable being introduced into the fiber optic cabinet. When a cable is introduced into the fiber optic cabinet, the craftsman doing the installation will remove the knock-out plug and insert a port adapter, which is compatible with the sealing method or device to be used, into the hole resulting from the removal of the knock-out plug.

After the fiber optic cable is secured in a port of the fiber optic cabinet, the semi-rigid sheath of the cable is removed to expose the loose buffer tubes 56 containing at least one optical fiber and strength members 54. FIGS. 2D, and 4A-4B, show an optical fiber cable containing one loose buffer tube 56 and one strength member 54, for simplicity. One of ordinary skill in the art would recognize that fiber optic cables may have more than a single loose buffer tube and a single strength member and that the choice of cables is determined by the network architecture into which the fiber optic cabinet is being deployed.

The fiber optic cable can be secured to a strain relief structure 130, shown in detail in FIGS. 2D, 4A and 4B. The strain relief structure can be in the form of a plate which can be secured to a mounting frame 142 within the fiber optic cabinet. The mounting frame can be secured to the base 110 of the fiber optical cabinet by a plurality of mechanical fasteners (e.g. bolts, screws, etc., not shown). The plate of the strain relief structure 130 can be secured to the mounting frame 142 by mechanical fasteners 131. In an exemplary aspect, the plate of the strain relief structure 130 can be electrically isolated from the mounting frame by placing a pair of intermating insulating inserts 138, 139 in the mounting holes of the plate of the strain relief structure. The intermating insulating inserts prevent the mechanical fastener from contacting the plate of the strain relief structure thus providing electrical isolation of the plate of the strain relief structure from the mounting frame. The intermating insulating inserts 138, 139 can be made of an insulating material such a phenolic resin such as a Bakelite® material which is available from Hexion Specialty Chemicals (Columbus, Ohio, USA), an insulating ceramic material, rubber or other polymeric insulating material. In an alternative aspect, the strain relief structure can be separately attached to the base of the fiber optic cabinet.

The strain relief structure 130 can have a plurality of anchors 132 disposed on the plate such that each anchor aligns with one of the ports 114 which pass through base 110. Each cable 50 can be secured to a corresponding anchor by fastening device 135 such as a hose clamp or a cable tie around the sheath 52 of the cable. Additionally, strain relief structure 130 can include a strength member retention feature 137. The strength member retention feature can be in the form of a peg that extends outward from the surface of strain relief structure 130 over each port 114. The peg can have a vertical hole drilled through the peg for the insertion of a rigid rod style strength member. The strength member may be secured within the hole by a fixing device, such as a screw, inserted into the end of the peg and tightened against the strength member such that the strength member is secured between the end of the fixing device and the wall of the hole through the peg. Alternatively, the peg of strength member retention feature 137 can have a notch formed therein for the securing of aramid yarn type strength members. In this embodiment, the aramid yarns can be wrapped around strength member retention feature and tied to secure them to the peg of strength member retention feature.

FIG. 2D shows the routing of a loose buffer tube 56 containing at least one optical fiber from optical fiber cable 50 as it enters an optical module 150 disposed in optical fiber termination block 140. A plurality of cable guides 143 may be attached to the mounting frame 142 of the optical distribution terminal to guide and help manage the loose buffer tubes as they are routed to the optical modules.

Referring to FIGS. 2A-2D and 5A-5B, an exemplary optical fiber termination block 140 or modular cable head is described in International Patent Publication No. WO2006/088931, and is incorporated by reference herein in its entirety. The optical fiber termination block 140 according to the present invention has a generally open, frame-like structure and comprises a mounting frame 142 for attaching the optical fiber termination block 140 to the base 110 of fiber optic cabinet 100 and a mounting structure 144 for receiving a plurality of optical modules 150 attached to the mounting frame.

The mounting structure can include a plurality of routing portions 145 for routing fiber optic cables, fiber optic ribbons, or optical fibers contained in protective buffer tubes 56 (FIG. 7) to and from optical modules 150 to ensure that the minimum bend radius of the fiber optic cables is maintained and to guide the cables/optical fibers as they enter/exit optical modules 150 disposed on the mounting structure 144. The routing portion 145 may be plate-like and can include fiber optic cable holders 146 or other means for appropriately holding and guiding fiber optic cables such as cable guide walls, hooks, loops or other suitable guide structures known in the art. Routing portions 145 can be used to store excess lengths of the incoming protective buffer tubes 56 containing optical fibers. Having some additional length stored of the incoming protective buffer tubes 56 containing optical fibers can enable a technician to remove the optical module 150 from the optical fiber termination block 140 so that it can be moved to a separate, more convenient work surface for installation and/or maintenance.

The routing plates 145 can be pivotally attached to the frame-like structure of the optical fiber termination block 140 (e.g. the mounting structure 144) to enable easy access to the individual routing plates and/or optical modules. The plates of the routing portions may be rotated from their closed or stowed position (shown in FIG. 5A) to an open position (shown in FIG. 5B). A closed position, as used herein, means a position in which the routing plate is located to some extent within the mounting structure 144 for storage and operation of the optical telecommunications elements, fiber-optic cables and/or devices, and an open position is understood to be a position in which an individual routing plate allows unhindered access to both the routing portion and the optical module 150, for example for installation and/or maintenance.

The plate-like routing portions 145 can be a thin sheet-like elements having two main surfaces on which the optical telecommunication modules 150, fiber-optic cables/protective tubes or optical fibers and/or other devices may be mounted or disposed.

The plates of the routing portion 145 rotate around a pivot axis 147 which is parallel to the longitudinal direction of the fiber optic cabinet. The pivot axis 147 can be preferably arranged at an extremity of the routing portion plates close to an accessible portion of the mounting structure 144, so that full access is provided to the fibers within the optical module and/or on routing plate when the routing plate is pivoted into an open position. The pivot axis 147 of each routing portion plate can have any acceptable hinge structure that allows the routing portion plate to pivot in a plain perpendicular to the pivot axis and therefore also perpendicular to the longitudinal direction of the fiber optic cabinet.

The routing plates 145 can be preferably be adapted to guide optical fiber cables entering and exiting one of said plurality of optical modules 150 in proximity of the pivot axis 147. The advantage of such an arrangement is that upon rotation of the routing plate from a closed position to an open position or visa-versa, the optical fibers of the cables are subjected to a minimal tensile stress due to the swinging of the optical module out of the mounting structure of optical fiber termination block 140, and controlling bending radius of the fibers within a desired range.

The fiber optic cabinet can accommodate one or more optical fiber termination blocks, depending on the desired capacity of the fiber optic cabinet. FIG. 2B shows an optical fiber cabinet having two optical fiber termination blocks 140a, 140b. In addition, each optical fiber termination block 140 can have a variable number of optical modules 150, depending on the desired capacity of the fiber optic cabinet and the function of each optical module. Each of optical fiber termination blocks shown in FIG. 2B includes twelve optical modules disposed on a like number of pivotal routing plates.

Figure 6:
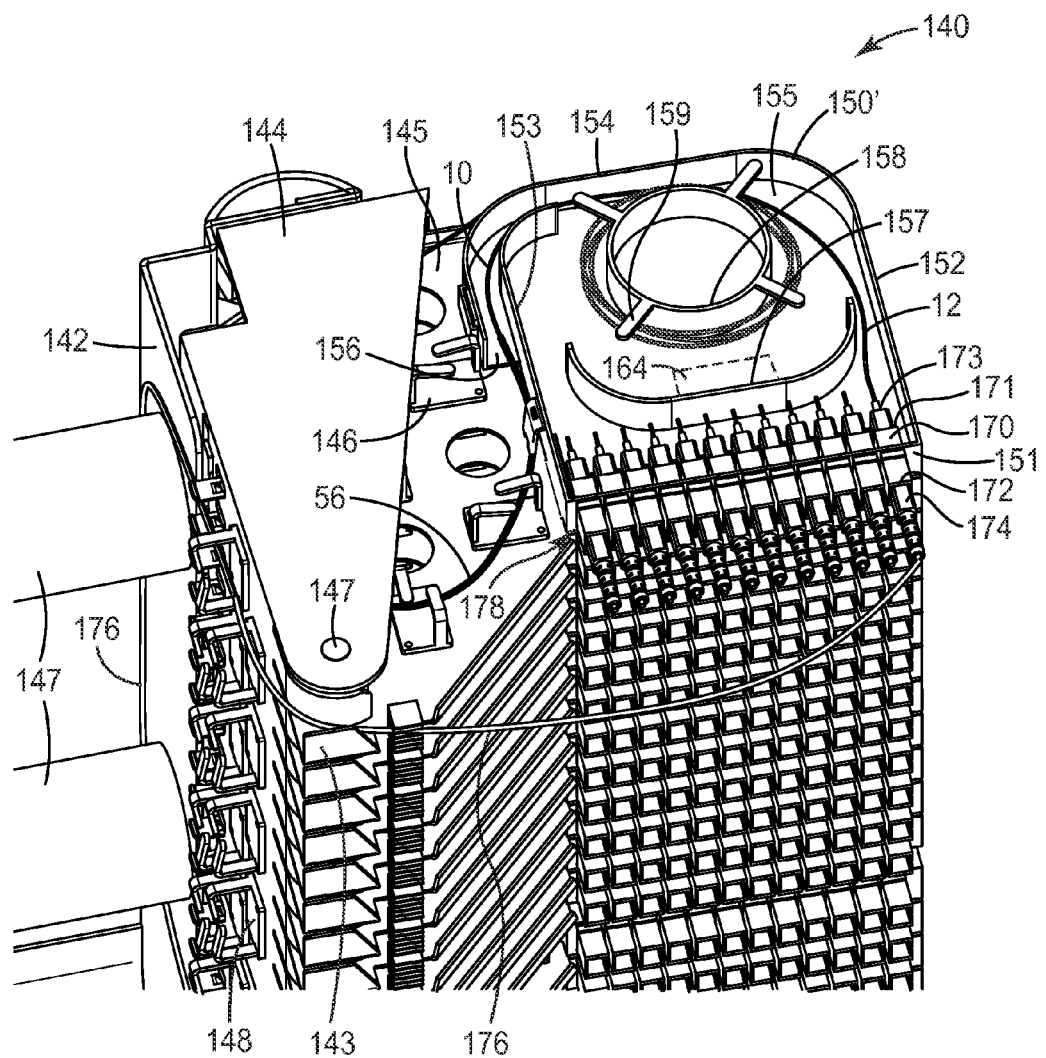
FIG. 6 is a detail view of an exemplary optical module in accordance with the present invention.
Figure 7:
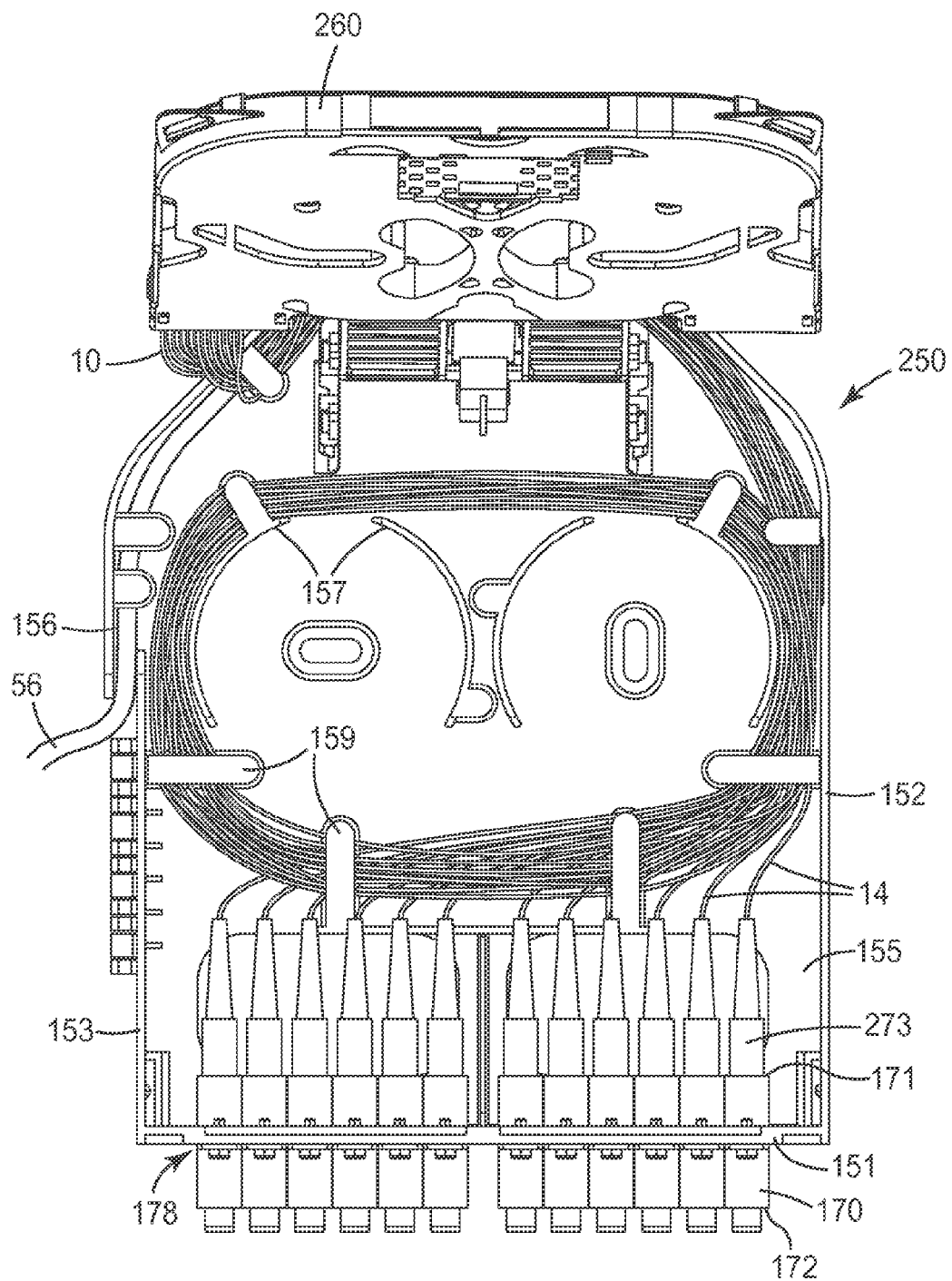
FIG. 7 is a detail view of an alternative exemplary optical module in accordance with the present invention.

The optical modules 150 of the optical fiber termination block 140 serve to establish connections between different signal transmitting optical fibers of the optical telecommunication network and to make connections within each optical module and accessible outside of the optical module. FIGS. 6 and 7 show two different embodiments of optical modules 150, 250.

Referring to FIG. 6, the optical fiber module can include a plurality of side walls 151-154 extending from a base plate. The optical module has an entry portion 156 disposed between a section of rear wall 154 and second side wall 153 to allow the passage of the optical fibers into the optical module. In addition optical fiber module can have guide walls 157, optical fiber storage hub 158 and optical fiber stays 159 to facilitate routing and storage of optical fibers within the optical fiber module. Optical module 150' can also have a plurality of twelve connector adaptors 170 disposed in the front side wall 151 of the optical module to form a patch panel 178 which optical connections are made by mating pairs of optical connectors. Optionally, the optical module can have a cover 179 to enclose the optical fibers, fiber pigtails and other contents of the optical module within the optical module when the fiber optic cabinet is in its operating state.

Figure 5A:
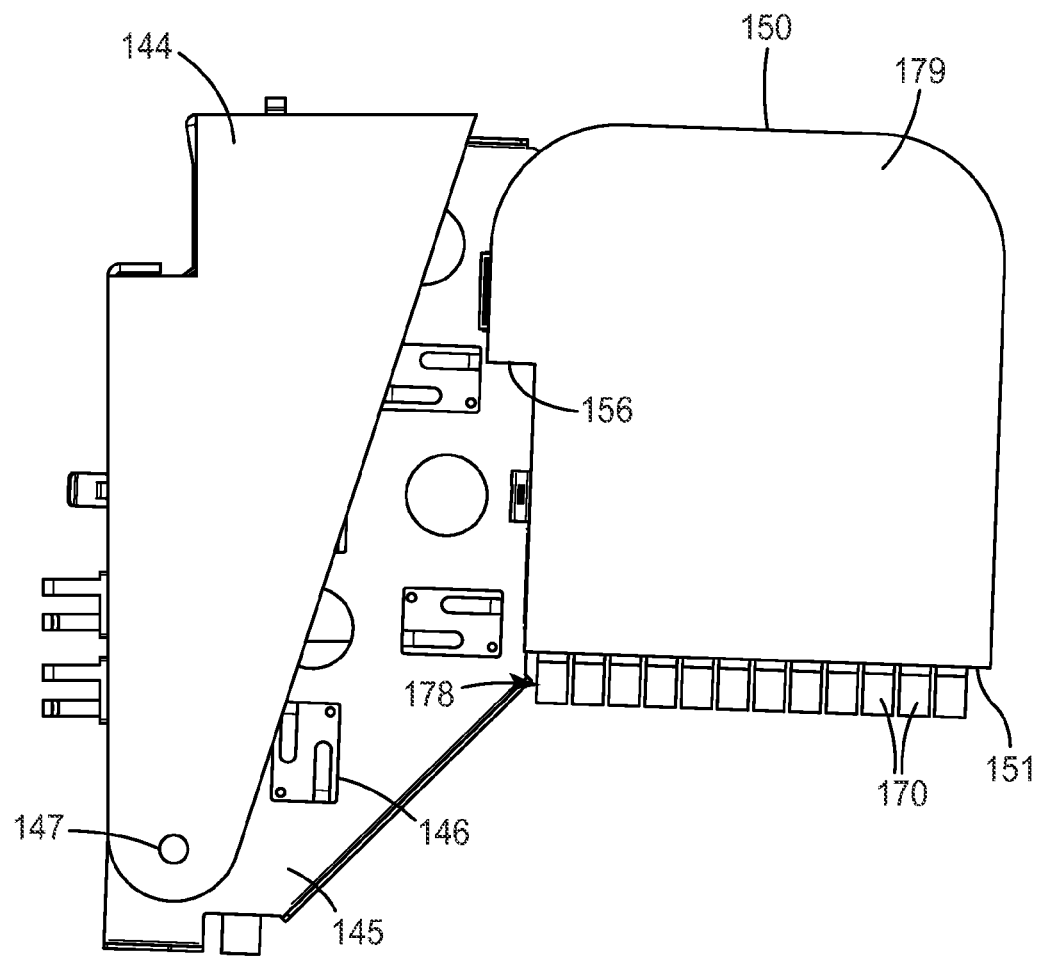
FIG. 5A-5B show two top views of an exemplary optical fiber termination block for use in a fiber optic cabinet in accordance with the present invention.
Figure 5B:
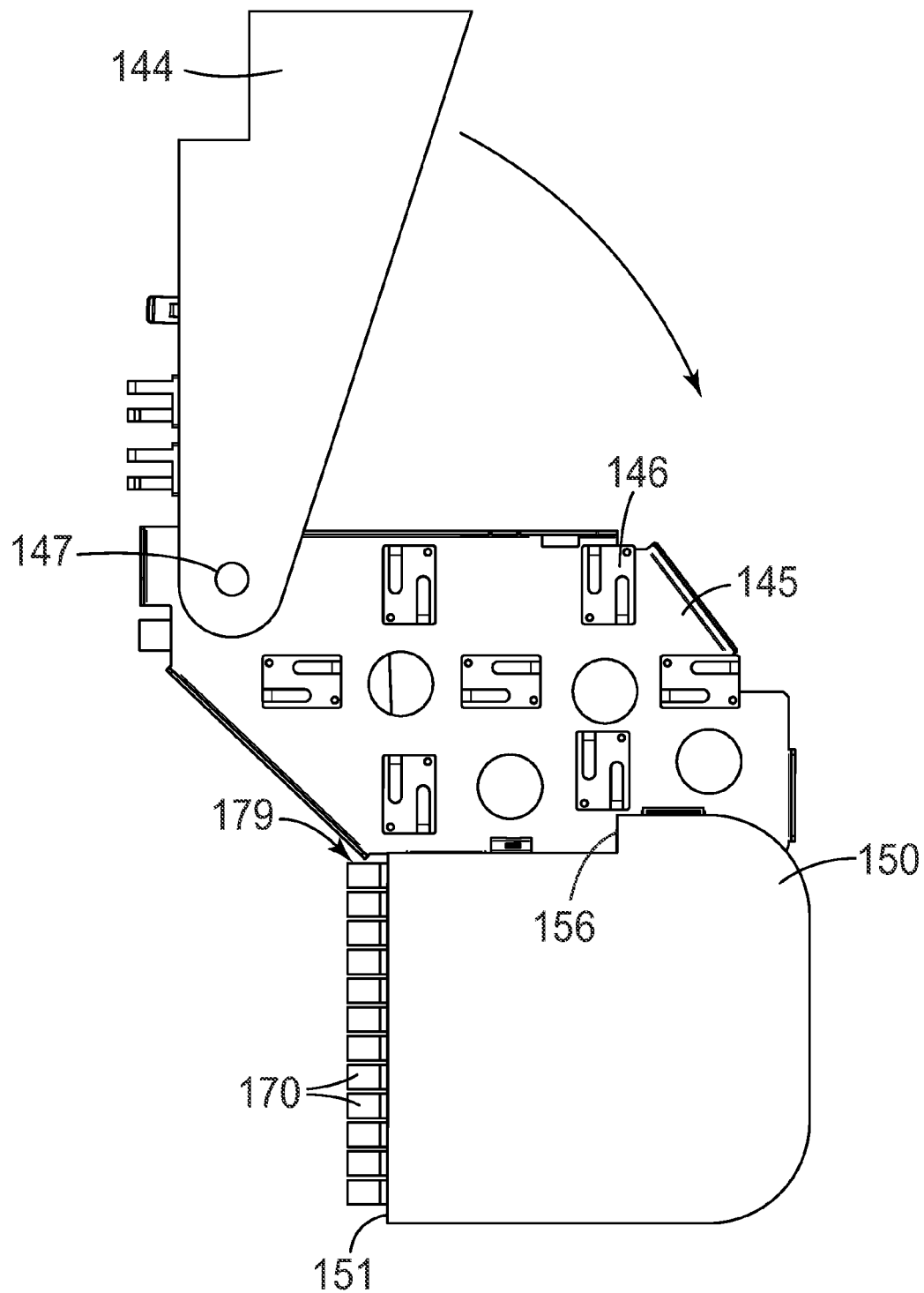

Optical module 150 shown in FIG. 5A has twelve connector adaptors 170 disposed in the front side wall 151 of the optical module to form a patch panel 178. Thus, twelve optical connections may be made between optical fibers 50 disposed within the optical module to the same number of connections outside of the optical module. Therefore, each optical module 150, 250 can include a plurality of optical connectors 174 as shown in FIGS. 6 and 7.

The optical module 150' of FIG. 6 provides slack storage and interconnection capabilities for optical fibers 10 that have been preterminated with optical connectors either in the factory or in the field using a field mountable optical connector. Alternatively, the optical fibers of the incoming cable can be remotely spliced to fiber optic pigtails such as in splice trays 180 as shown in FIG. 2C. The fiber pigtails can then be routed to the individual optical modules for interconnection.

The fibers from the preterminated optical fibers 10 can be organized and stored within optical module 150'. The optical connectors 173 on the preterminated optical fibers 12 can be inserted into the first side 171 of connector adaptors 170 on the inside of the optical module 150'. The optical connection can be completed when a second optical connector 174 on a patch cord 176 or other terminated optical fiber cable is inserted into the second side 172 of connector adapter 170 on the outside of the optical module.

In an exemplary aspect of the fiber optic cabinet, path cord 176 may be routed from the patch panel of a first optical module 150a to a patch panel of a second optical module 150b as shown in FIGS. 2B, 2C and 6. The patch cord is guided around the edge of the mounting frame 142 by guides 143 that are disposed adjacent to the pivot axis of the routing portion plates. Additional patch cord guide rings 148 and cable management hubs are disposed on the mounting structure to facilitate the storage and routing management of the patch cords in use in the fiber optic cabinet.

Within the optical module 150', optical connectors 173 can be provided with a length of residual optical fiber, which needs to be stored within the optical module. Thus, each optical module can include a slack cable storage portion for storing this excess length of optical fiber within the optical module that includes guide walls 157, optical fiber storage hub 158 and optical fiber stays 159.

Optionally, optical module 150' can further include a splicing area 164 adjacent to fiber management portion 155. The splicing area can include a commercially available splice insert (not shown) which is capable of holding a plurality of optical fiber splices. The optical fiber splices may be either fusion splices or mechanical splices as are known in the art. These splices can be used to splice optical fiber pigtails to the ends of individual optical fibers within optical module 150'.

Alternatively, optical fiber pigtails 14 can be spliced using either mechanical or fusion splices disposed in tray 260 to individual optical fibers 10 in optical module 250 as shown in FIG. 7. The optical connectors 273 on the pigtails 14 can be inserted into the first side 171 of connector adaptors 170 on the inside of the optical module 250. The optical connection can be completed when a second optical connector on a patch cord or other terminated optical fiber cable is inserted into the second side 172 of connector adapter 170 on the outside of the optical module 250.

As illustrated in FIG. 7, optical telecommunication module 250 can include one or more trays 260 to hold and secure optical fiber splices (e.g. mechanical or fusion splices) between incoming optical fibers and fiber pigtails and/or between incoming optical fibers and the optical devices housed within the optical module. Tray 260, shown in FIG. 7, is hingedly attached to the slack storage portion of optical module 250. Alternatively, one or more stackable trays may be disposed within the optical module and housed above the slack storage portion of the optical module.

The ability to utilize optical devices within the optical fiber termination block greatly enhances the flexibility of the block for a number of different applications or for use at several points within the optical network. This added flexibility enables the selection or expansion of capability at a lower cost. In addition, the compact foot print of the exemplary high density fiber optic cabinet 100 can provide significant space savings by eliminating large dedicated optical modules and distribution frames from the central office and/or other facility.

In another alternative embodiment, one or more optical fibers from the incoming optical cable can be spliced to the input fiber(s) of an optical device(s) (e.g. an m×n optical splitter) and the output fibers can be spliced to terminated optical fiber pigtails on a tray within the optical module. The optical connectors on the pigtails can be inserted into the first side of connector adaptors on the inside of the optical module. The optical connection can be completed when an optical connector on a patch cord or other terminated optical fiber cable is inserted into the second side of connector adapter on the outside of the optical module.

In a further alternative embodiment, the optical module can be used as a stand alone optical device module without any splicing to the main cable (i.e. all connections may be made through the patch panel on the front face of the module). Optical devices may comprise passive optical devices such as splitters, couplers, wavelength division multiplexers, and optical switches or active optical devices such as amplifiers.

In an alternative embodiment, field mount optical connectors may be attached to the individual optical fibers of the incoming optical cables within the optical module and residual lengths of the incoming fibers can be stored in the slack storage portion of the module. In this case, no tray is required in the optical module. Alternatively, the splicing can be integral with the slack storage portion of the optical module.

Optical connectors that are usable with the disclosed optical modules can include any conventional single fiber or multi-fiber connector format as dictated by the design architecture of the optical network. In addition, while the embodiments described herein describe optical modules having twelve optical connector adapters contained therein, this language should not be deemed as limiting as it is anticipated that more or fewer optical connectors may be disposed within a given optical module and is a matter of design choice and connector format.

Optical connectors 174 may be connectors such as a SC, ST, FC, or LC style connectors, to name a few, and may be, for example, either a positive contact (PC) or an angled polished connector (APC) type of connector. Sample connectors include 3M™ No Polish Connector SC Plug, 3M™ Hot Melt LC Connector, and 3M™ CRIMPLOK™ ST SM 126 UM Connector, each of which is available from 3M Company (St. Paul, Minn.). Alternatively, the optical connectors can be a field mountable connector such as SC, ST, FC, or LC connectors, e.g. 3M™ SC No Polish Connector available from 3M Company (St. Paul, Minn.). In an alternative aspect, the optical connectors can be multi-fiber connectors such as an MPO, MTP or VF-45 style connector mounted on either a multi-fiber pigtail or patch cord.

Tray 260 may take up a certain amount of stored fiber in addition to the fiber splices. In this respect, it is advantageous if the tray is hingedly attached to optical module 250 or removable from the optical module to enable easy access to the slack cable storage portion 155. In addition, this configuration facilitates installation of new optical fiber lines by separating main storage space from the splicing space within the optical module.

Figure 8A:
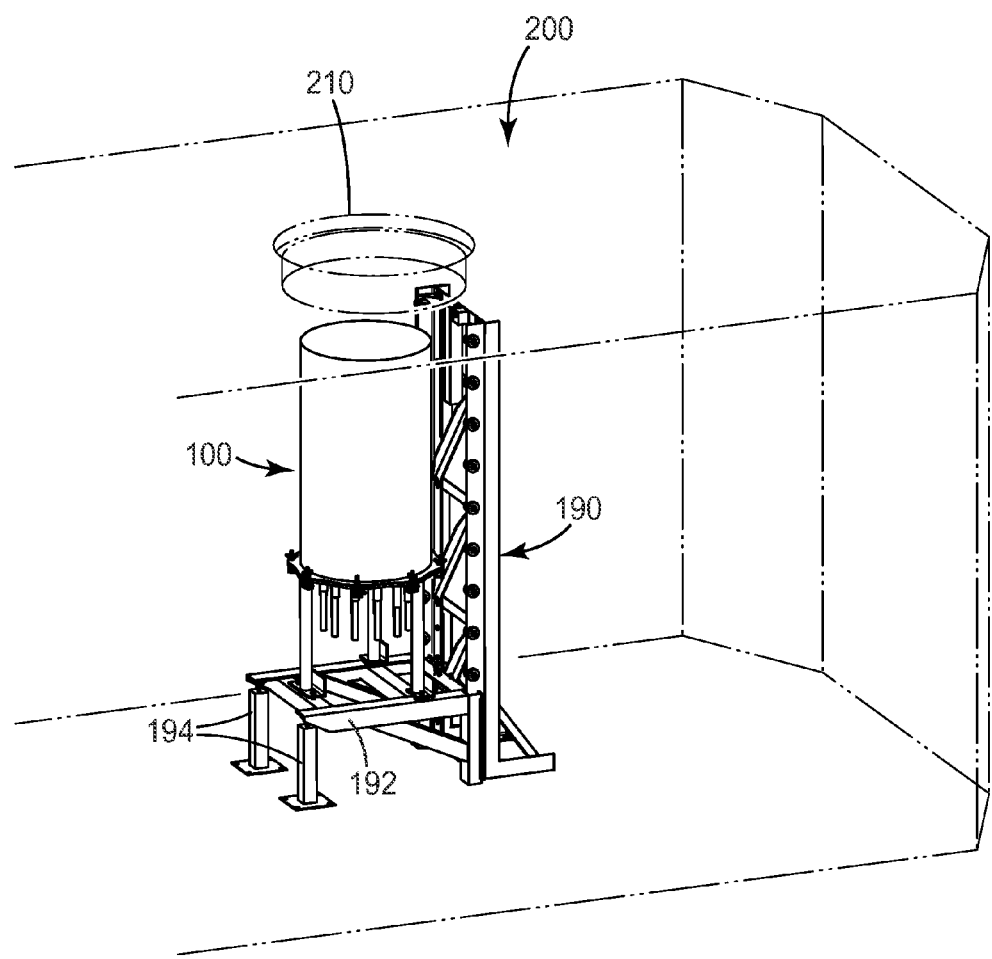
FIG. 8A shows an exemplary fiber optic cabinet situated in an underground vault when it is in service.
Figure 8B:
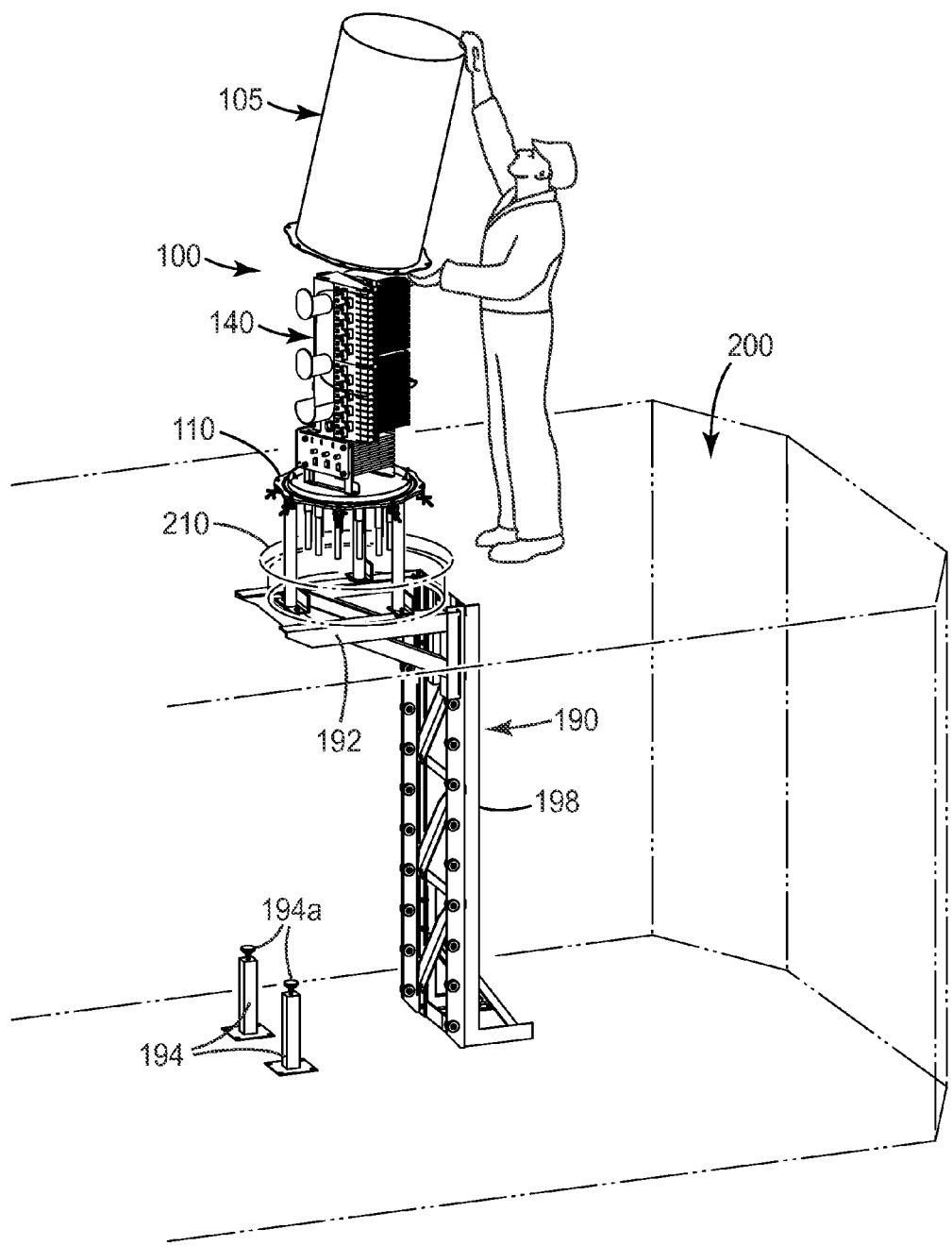
FIG. 8B shows the fiber optic cabinet after it has been raised out of the underground vault through a manhole.

FIG. 8A shows how the exemplary fiber optic cabinet 100 can be situated on its lift platform 192 in an underground vault when it is in service. FIG. 8B shows the fiber optic cabinet after it has been raised out of the underground vault through manhole 210 using a hand winch (not shown). Being able to raise the fiber optic cabinet to ground-level, facilitates installation and maintenance activities. The lift can have an arrestor pin (not shown) to secure the lift platform to the guide rails in a raised position during installation and maintenance procedures. When work is completed, the arrestor pin can be released to allow the lift to be lowered returning the fiber optic cabinet to the underground vault.

In an alternative aspect of the invention, it may be desirable to direct splice optical fibers of one optical fiber cable (e.g. from a main cable) to the optical fibers in another optical fiber cable (e.g. a smaller branch or distribution cable). To address this possible need, splice trays 180 may be added to fiber optic cabinet as shown in FIG. 2C. The splice trays can be held by a splice tray support structure 182 which can be either attached to the mounting frame 148 or formed integrally formed with the mounting frame. Alternatively, stacking splice trays may be used which can be belted together and secured to the base of the fiber optic cabinet.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodi-

What is claimed is:

1. A fiber optic telecommunication cabinet comprising:
a base configured for attachment to an open first end of a housing to provide an enclosed configuration, the housing defining a longitudinal direction of the fiber optic telecommunication cabinet between the base and a second end of the housing, the base defining a plurality of ports passing through the base to allow passage of telecommunication cables therethrough,
an optical fiber termination block comprising a mounting frame attaching the optical fiber termination block to the base of the fiber optic telecommunication cabinet and a plurality of optical modules supported by the mounting frame, wherein the optical modules are pivotally mounted within the optical fiber termination block and can be rotated in a plane perpendicular to the longitudinal direction of the fiber optic telecommunication cabinet from a first storage position to a second accessible position; and
a lift to raise the fiber optic telecommunication cabinet out of an underground vault, wherein the lift comprises a lift platform, wherein the fiber optic cabinet is disposed on the lift platform, and wherein a lifting rod attached to the lift platform via a hook of a winch may be connected to raise the fiber optic cabinet.

2. The fiber optic cabinet of claim 1, wherein each optical module includes a patch panel comprising a plurality of optical fiber connector adapters for connecting an optical fiber cable inside said optical module to a patch cord disposed outside of said optical module.

3. The fiber optic cabinet of claim 2, wherein the patch panel is disposed on a front wall of the optical module.

4. The fiber optic cabinet of claim 1, wherein at least one of the plurality of optical modules includes at least one splice tray.

5. The fiber optic cabinet of claim 1, wherein the optical fiber termination block further includes at least one optical device module.

6. The fiber optic cabinet of claim 2, further comprising a patch cord interconnecting two of the fiber optic connector adapters.

7. The fiber optic cabinet of claim 1, further comprising a plurality of splice trays to allow direct splicing of optical fibers in two fiber optic cables.

* * * * *